United States Patent
Yamaguchi et al.

(10) Patent No.: US 11,267,478 B2
(45) Date of Patent: Mar. 8, 2022

(54) VEHICLE MONITORING DEVICE

(71) Applicant: ISUZU MOTORS LIMITED, Tokyo (JP)

(72) Inventors: Kazuhiko Yamaguchi, Fujisawa (JP); Shigeru Takinami, Fujisawa (JP); Mayumi Iwao, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/278,154

(22) PCT Filed: Sep. 19, 2019

(86) PCT No.: PCT/JP2019/036790
§ 371 (c)(1),
(2) Date: Mar. 19, 2021

(87) PCT Pub. No.: WO2020/059807
PCT Pub. Date: Mar. 26, 2020

(65) Prior Publication Data
US 2021/0347365 A1    Nov. 11, 2021

(30) Foreign Application Priority Data

Sep. 20, 2018   (JP) .............................. JP2018-176322

(51) Int. Cl.
*B60W 40/08*       (2012.01)
*B60W 50/14*       (2020.01)
(Continued)

(52) U.S. Cl.
CPC ............ *B60W 40/08* (2013.01); *B60W 50/14* (2013.01); *G06K 9/00228* (2013.01);
(Continued)

(58) Field of Classification Search
CPC ................. B60W 40/08; B60W 50/14; B60W 2540/225; B60W 2540/223;
(Continued)

(56) References Cited

U.S. PATENT DOCUMENTS 8,447,072 B2 *   5/2013   Takahashi .............. G08G 1/167
                                                         382/103
10,761,532 B2 *  9/2020   Nakamura ........... G05D 1/0088
(Continued)

FOREIGN PATENT DOCUMENTS

JP      2009175929 A      8/2009
JP      2009244959 A     10/2009
(Continued)

OTHER PUBLICATIONS

International Search Report and Written Opinion for related PCT App No. PCT/JP2019/036790 dated Dec. 17, 2019, 6 pgs. (partial translation).

*Primary Examiner* — Mohamed Barakat
(74) *Attorney, Agent, or Firm* — Procopio, Cory, Hargreaves & Savitch LLP

(57) ABSTRACT

An imaging unit 2 captures an image of a driver of a vehicle. A driving state measurement unit 70 analyzes the image captured by the imaging unit 2 and measures a plurality of driving states including the driver's face orientation angle. A traveling state determination unit 71 determines the traveling state of the vehicle. An alarm determination unit 72 determines whether to activate an alarm device 5 on the basis of the driving states and the traveling state. When the face orientation angle acquired from the driving state measurement unit 70 is out of a normal determination reference range, and it is determined that the driving states other than the face orientation angle are normal and the traveling state is also normal, the alarm determination unit 72 causes the (Continued)

driving state measurement unit 70 to re-execute the face orientation angle detection process.

5 Claims, 5 Drawing Sheets

(51) Int. Cl.
*G06K 9/00* (2006.01)
*G08G 1/16* (2006.01)

(52) U.S. Cl.
CPC ........... *G06K 9/00845* (2013.01); *G08G 1/16* (2013.01); *B60W 2050/143* (2013.01); *B60W 2420/42* (2013.01); *B60W 2540/223* (2020.02); *B60W 2540/225* (2020.02)

(58) Field of Classification Search
CPC ........ B60W 2050/143; B60W 2420/42; G06K 9/00228; G06K 9/00845; G08G 1/16
See application file for complete search history.

(56) References Cited

U.S. PATENT DOCUMENTS

| | | | |
|---|---|---|---|
| 2009/0273687 A1* | 11/2009 | Tsukizawa | G06T 7/74 348/222.1 |
| 2017/0004354 A1* | 1/2017 | Noridomi | G06T 7/74 |
| 2018/0197030 A1 | 7/2018 | Yamataka et al. | |
| 2018/0268230 A1* | 9/2018 | Torii | G02B 27/01 |
| 2018/0357494 A1* | 12/2018 | Herbst | G06K 9/00791 |

FOREIGN PATENT DOCUMENTS

| | | |
|---|---|---|
| JP | 2014019301 A | 2/2014 |
| WO | 2017006853 A1 | 1/2017 |

\* cited by examiner

VEHICLE MONITORING DEVICE

CROSS-REFERENCE TO RELATED APPLICATIONS

This application is a U.S. National Stage entry of PCT Application No: PCT/JP2019/036790 filed Sep. 19, 2019, which claims priority to Japanese Patent Application No. 2018-176322 filed Sep. 20, 2018, the contents of which are incorporated herein by reference.

TECHNICAL FIELD

The present invention relates to a monitoring device, and more particularly, to a device mounted on a vehicle for monitoring a driver of the vehicle.

BACKGROUND ART

In recent years, various technologies for detecting that a driver is incapable of driving and preventing accidents have been proposed. For example, Patent Literature 1 discloses a technique in which an emergency evacuation device described therein recognizes degree of deterioration of consciousness, degree of awakeness, posture, and the like of a driver by using gaze information, eye blink information, face orientation information, and the like of the driver from an image obtained by capturing the driver, and supports emergency evacuation when the drivers condition is deteriorated.

CITATION LIST

Patent Literature

Patent Literature 1: JP-A-2014-19301

SUMMARY OF INVENTION

Technical Problem

Various support devices and alarm devices including the device described above are very useful when the condition of the driver can be properly detected. However, when the support device or the alarm device operates based on false detection, concentration of a driver who is driving the vehicle may be disturbed.

The present invention has been made in view of these points, and an object of the present invention is to provide a technique for suppressing an erroneous determination regarding the driving state.

Solution to Problem

A first aspect of the present invention is a monitoring device for a vehicle. This device may include an imaging unit which captures an image of a driver of a vehicle, a driving state measurement unit which analyzes the image captured by the imaging unit and measures a plurality of driving states including a face orientation angle of the driver, a traveling state determination unit which determines a traveling state of the vehicle, and an alarm determination unit which determines whether or not to activate an alarm device based on the driving states and the traveling state. In this example, when the face orientation angle acquired from the driving state measurement unit is outside a normal determination reference range, and when it is determined that the driving states other than the face orientation angle are normal and that the traveling state is also normal, the alarm determination unit causes the driving state measurement unit to re-execute the face orientation angle detection process.

When the state in which the face orientation angle acquired from the driving state measurement unit is outside the normal determination reference range continues for a predetermined time, and when it is determined that the driving states other than the face orientation angle are normal and that the traveling state is also normal, the alarm determination unit may cause the driving state measurement unit to re-execute the face orientation angle detection process.

The traveling state determination unit may include a data observation unit which observes type 1 observation data, which is a plurality of pieces of observation data constantly observed based on an in-vehicle sensor mounted on the vehicle, and type 2 observation data, which is a plurality of pieces of observation data observed at a time of operating an operation unit mounted on the vehicle by the driver, and a state determination unit which determines whether or not the traveling state is normal based on whether or not each piece of type 1 observation data is included within a normal determination reference range determined for each piece of type 1 observation data and whether or not type 2 observation data is observed.

Even when the face orientation angle acquired from the driving state measurement unit is outside the normal determination reference range, when it is determined that the driving states other than the face orientation angle are normal and that the traveling state is also normal, the alarm determination unit prohibits the activation of the alarm device.

The vehicle monitoring device may include a coordinate detection unit which detects position information indicating a position of the vehicle and a traveling direction, and a sunshine orientation acquisition unit which acquires a sunshine orientation by referring to a sunshine orientation database that stores dates and times, the position information, and the sunshine orientations in association with each other, in which, when the face orientation angle acquired from the driving state measurement unit is outside the normal determination reference range, the alarm determination unit may cause the driving state measurement unit to re-execute the face orientation angle detection process, on condition that it is determined that the driving states other than the face orientation angle are normal and that the traveling state is also normal, and that the traveling direction of the vehicle and the sunshine orientation at the position of the vehicle satisfy a predetermined relationship.

Advantageous Effects of Invention

According to the present invention, it is possible to suppress erroneous determination regarding the driving state.

DESCRIPTION OF EMBODIMENTS

<Outline of Embodiment>

Figure 1:
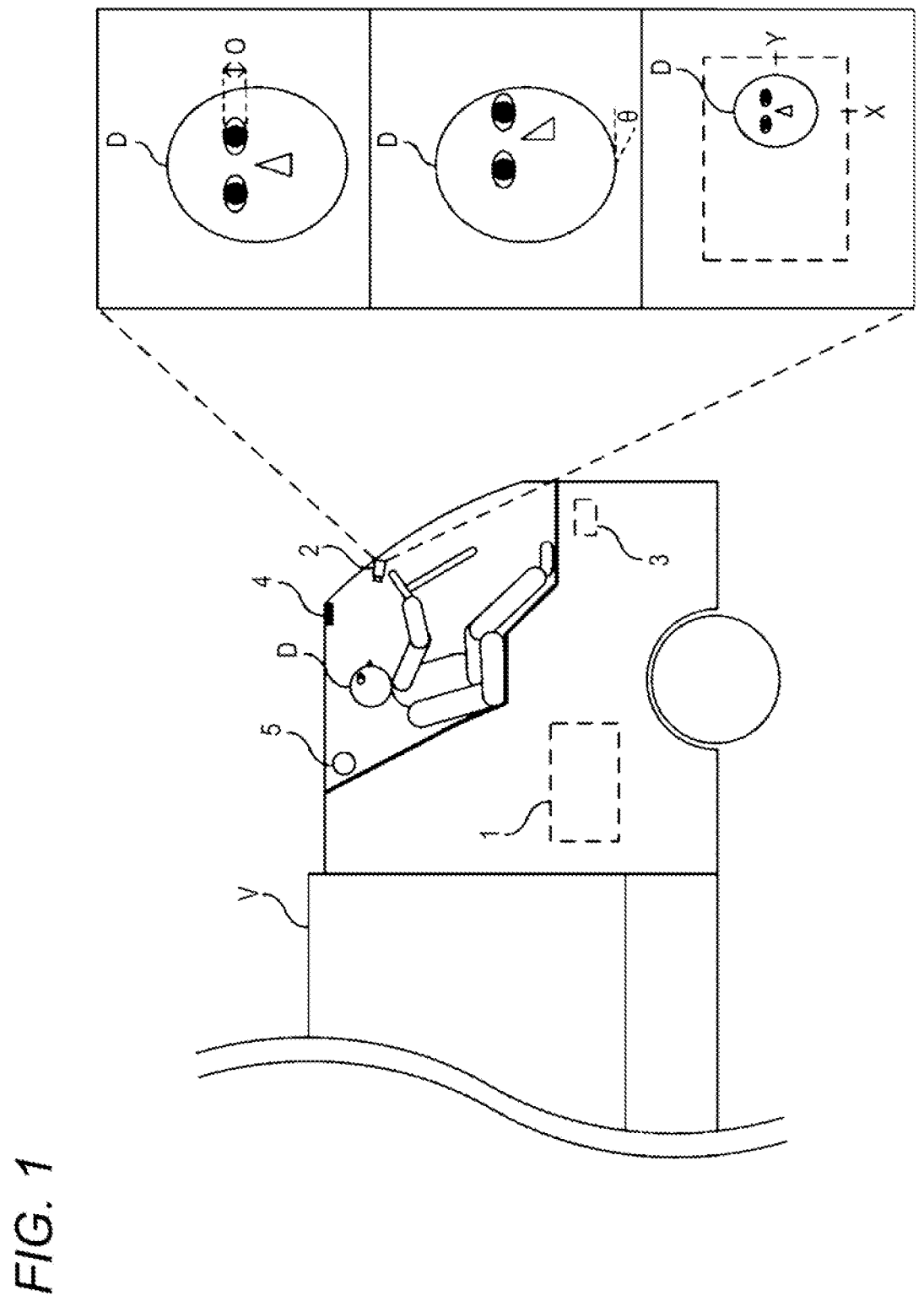
FIG. 1 is a schematic diagram for explaining an outline of a vehicle monitoring device according to an embodiment.

FIG. 1 is a schematic diagram for explaining an outline of a vehicle monitoring device 1 according to an embodiment. In the example shown in FIG. 1, the vehicle monitoring device 1 is mounted on a vehicle V driven by a driver D. The vehicle V also includes an imaging unit 2, an in-vehicle sensor 3, a GPS reception unit 4, and an alarm device 5 as a part of the vehicle monitoring device 1.

The imaging unit 2 is a solid-state image sensor such as a charge coupled device (CCD), a complementary metal oxide semiconductor (CMOS), or the like, and captures an image of the driver D of the vehicle V. The vehicle monitoring device 1 determines whether or not the driving state of the vehicle V by the driver D is appropriate, based on an eye opening degree indicating a degree of opening the eyes of the driver D, an angle of face orientation of the driver D, and a position of a face of the driver D, and the like, which are obtained by analyzing the image captured by the imaging unit 2.

In FIG. 1, the eye opening degree of the driver D is represented by O, a gaze direction of the driver D is represented by an angle θ, and the position of the face of the driver D is represented by two-dimensional coordinates (X, Y). As will be described in detail below, various information such as the eye opening degree, the angle of the face orientation, the position of the face, and the like of the driver D is analyzed by dedicated modules included in the vehicle monitoring device 1, respectively.

Here, the "driving state of the vehicle V by the driver D" means a state of the driver D indicating whether or not the driver D is capable of driving the vehicle V normally. For example, when the driver D is crouching due to heart disease, cerebral infarction, or the like so as to be incapable of driving, since the driver D cannot drive the vehicle V normally, it can be said that the driving state is "unsuitable". Further, it can also be said that it is unsuitable when the eyes of the driver D are closed.

The in-vehicle sensor 3 is various in-vehicle sensors for measuring the traveling state of the vehicle V. In this example, the "traveling state of the vehicle V" means a moving state of the vehicle V indicating whether or not the vehicle V is normally driving. The traveling state of the vehicle V is determined by the vehicle monitoring device 1 in consideration of speed and acceleration of the vehicle V, yaw rate, steering angle, operation of various pedals, operation of a wiper, operation of a direction indicator, operation of an auxiliary brake, shift operation, traveling position of the vehicle V in a road lane, distance from a preceding vehicle and the like.

The global positioning system (GPS) reception unit 4 receives GPS data from a navigation satellite. The alarm device 5 generates an alarm to call the attention of the driver.

Among the data used by the driver D to determine the driving state of the vehicle V, the face orientation angle of the driver D is one of the important data. A large face orientation angle of the driver D with respect to the traveling direction of the vehicle V suggests that the driver D may be looking aside. Therefore, the face orientation angle of the driver D is a useful clue for determining the driving state of the driver D.

Meanwhile, in order to detect the face orientation angle of the driver D, the vehicle monitoring device 1 first specifies the position of the face of the driver D from the image captured by the imaging unit 2, and further detects each part such as the eyes and nose of the driver D, calculates the positional relationship of each detected part thereon, and detects the face orientation angle of the driver D, for example. As described above, the detection accuracy of the face orientation angle of the driver D depends on the detection accuracy of the face position and each part of the face of the driver D. Even when any of the detection accuracies decreases, it affects the detection accuracy of the face orientation angle of the driver D, so that a situation may also occur in which the face orientation angle cannot always be detected with good accuracy.

As described above, while the face orientation angle of the driver D is useful for determining the driving state of the driver D, in situations where the accuracy of the face orientation angle is low, situations may occur where alarms should not be issued to call the attention of the driver depending on the face orientation angle.

Therefore, when the face orientation angle of the driver D is outside a normal determination reference range, the vehicle monitoring device 1 according to an embodiment re-executes a face orientation angle detection process when it is determined that the driving states other than the face orientation angle are normal and that the traveling state of the vehicle V is also normal. As a result, the vehicle monitoring device 1 can suppress erroneous determination regarding the driving state, and as a result, the vehicle monitoring device 1 can also suppress notification of an alarm based on the erroneous determination. As a result, it is possible to prevent the driver D from feeling unpleasant or being distrustful due to the notification of alarm based on erroneous determination.

<Functional Configuration of Vehicle Monitoring Device 1 According to Embodiment>

Figure 2:
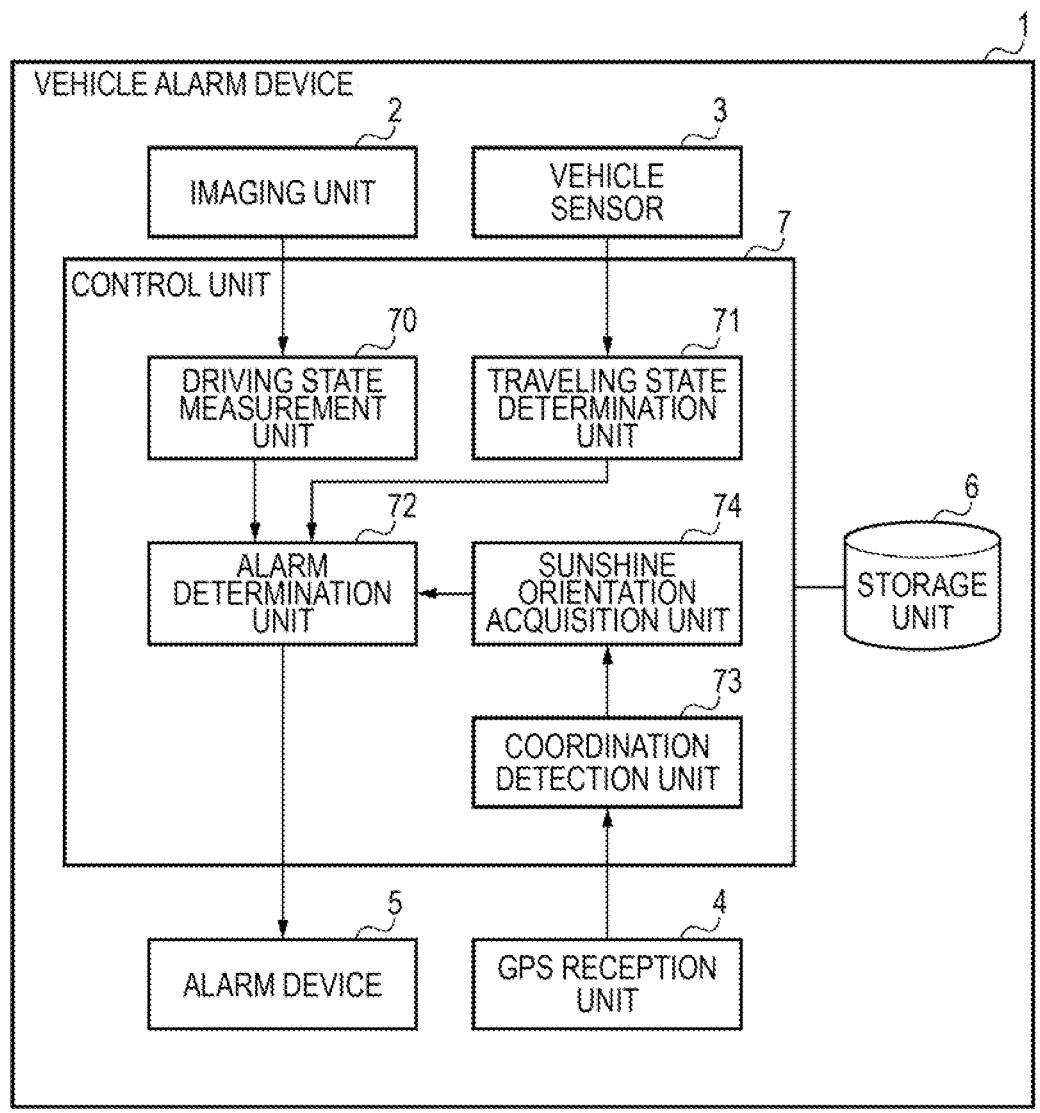
FIG. 2 is a diagram schematically showing a functional configuration of a vehicle monitoring device according to an embodiment.

FIG. 2 is a diagram schematically showing a functional configuration of the vehicle monitoring device 1 according to an embodiment. In addition to the imaging unit 2, the in-vehicle sensor 3, the GPS reception unit 4, and the alarm device 5 described above, the vehicle monitoring device 1 also includes a storage unit 6 and a control unit 7. In FIG. 2, the arrows indicate the main data flows, and there may be data flows not shown in FIG. 2. In FIG. 2, each functional block shows a configuration of a functional unit, rather than a configuration of a hardware (device) unit. Therefore, the functional blocks shown in the drawing may be mounted in a single device, or may be mounted separately in a plurality of devices. Transmission and reception of data between the functional blocks may be performed via any means such as a data bus, a network, a portable storage medium, or the like.

The storage unit 6 is a Read Only Memory (ROM) for storing the Basic Input Output System (BIOS) or the like of the computer that realizes the vehicle monitoring device 1, a Random Access Memory (RAM) serving as a work area for the vehicle monitoring device 1, or a large-capacity storage device such as Hard Disk Drive (HDD) or Solid State Drive (SSD) for storing Operating System (OS) or application program, or various information referenced to when the application program is executed.

The control unit 7 is a processor such as an Electronic Control Unit (ECU) or the like of the vehicle V, and serves as a driving state measurement unit 70, a traveling state determination unit 71, an alarm determination unit 72, a coordinate detection unit 73, and a sunshine orientation acquisition unit 74 by executing the programs stored in the storage unit 6.

The imaging unit 2 captures an image of the driver D of the vehicle V. Specifically, the imaging unit 2 is installed so as to be able to capture an image including a seat of the driver of the vehicle V as a subject, and generates an image such as an image of capturing the driver D as the driver D gets into the vehicle V and drives the vehicle V.

The driving state measurement unit 70 analyzes the image captured by the imaging unit 2 and measures a plurality of driving states including the face orientation angle of the driver D.

Figure 3:
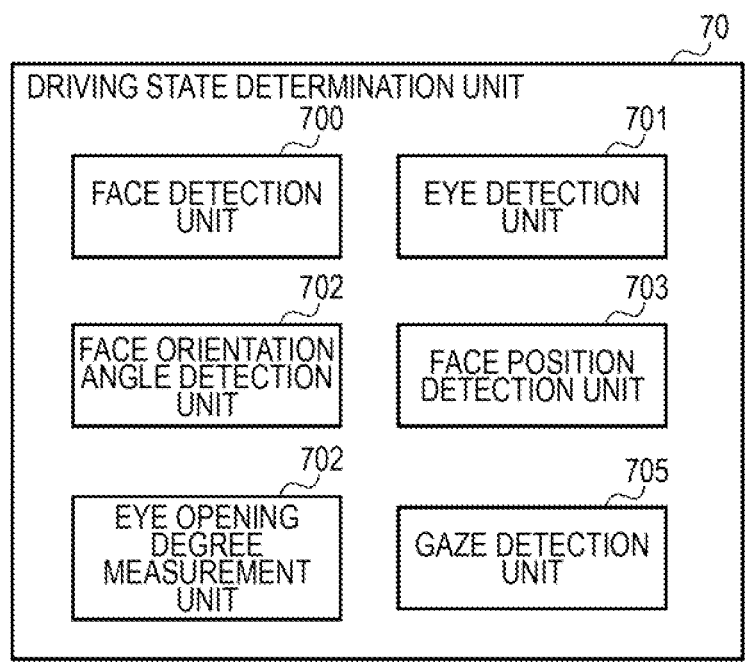
FIG. 3 is a diagram schematically showing a functional configuration of a driving state measurement unit according to an embodiment.

FIG. 3 is a diagram schematically showing a functional configuration of the driving state measurement unit 70 according to an embodiment. As shown in FIG. 3, the driving state measurement unit 70 according to the embodiment includes at least a face detection unit 700, an eye detection unit 701, a face orientation angle detection unit 702, a face position detection unit 703, an eye opening degree measurement unit 704, and a gaze detection unit 705.

The face detection unit 700, the eye detection unit 701, the face orientation angle detection unit 702, the face position detection unit 703, the eye opening degree measurement unit 704, and the gaze detection unit 705 are realized by using a known image recognition technology or image process technology, respectively. Since it is a known technique, it will not be described in detail, but the face detection unit 700 detects a face present in the image captured by the imaging unit 2. The eye detection unit 701 detects eyes present on the face detected by the face detection unit 700.

The face orientation angle detection unit 702 detects an angle indicating the orientation of the face detected by the face detection unit 700. The face position detection unit 703 detects position coordinates of a face in the two-dimensional coordinate system set in the image captured by the imaging unit 2. Note that the face position detection unit 703 may detect three-dimensional coordinates indicating a position where the face is present in the vehicle V, in a three-dimensional coordinate system having an origin at any point in the vehicle V in which the imaging unit 2 is installed.

The eye opening degree measurement unit 704 measures the eye opening degree detected by the eye detection unit 701. The gaze detection unit 705 detects an angle indicating the gaze direction of the driver D.

Return to the description of FIG. 2. The traveling state determination unit 71 determines the traveling state of the vehicle V based on various measurement data of the in-vehicle sensor 3. The alarm determination unit 72 determines whether or not to activate the alarm device 5 based on the driving state measured by the driving state measurement unit 70 and the traveling state determined by the traveling state determination unit 71.

When the face orientation angle acquired from the driving state measurement unit 70 is outside the normal determination reference range, and when it is determined that the driving states other than the face orientation angle are normal and that the traveling state is also normal, the alarm determination unit 72 causes the driving state measurement unit 70 to re-execute the face orientation angle detection process. When it is determined that the driving states other than the face orientation angle are normal and that the traveling state is also normal, it is highly probable that only the face orientation angle measurement has failed. In such a case, the alarm determination unit 72 causes the driving state measurement unit 70 to initialize the face orientation angle detection process and start over from the beginning. As a result, the vehicle monitoring device 1 can suppress the erroneous determination caused by the face orientation angle detection, and further, can also suppress the false alarm based on the erroneous determination.

In addition, even when the face orientation angle acquired from the driving state measurement unit 70 is outside the normal determination reference range, when it is determined that the driving states other than the face orientation angle are normal and that the traveling state is also normal, the alarm determination unit 72 prohibits the activation of the alarm device. As a result, the vehicle monitoring device 1 according to the embodiment can suppress the notification of the alarm based on the erroneous determination regarding the driving state.

In this example, the "normal determination reference range" is a reference angle range for re-detection determination which is referenced by the alarm determination unit 72 to determine whether or not to cause the driving state measurement unit 70 to re-execute the face orientation angle detection process. While the specific value of the normal determination reference range may be preferably determined by an experiment in consideration of the size of the wheels of the vehicle V, the position of the rearview mirror of the vehicle V, and the like, it is a range within 45 degrees with respect to the traveling direction of the vehicle V, for example.

Note that, depending on the set value of the normal determination reference range, even when the vehicle V is driving normally, the face orientation angle of the driver D may sometimes be momentarily outside the normal determination reference range, such as when checking the rearview mirror or car navigation, or the like. In such a case, when the alarm determination unit 72 immediately causes the driving state measurement unit 70 to re-execute the detection of the face orientation angle, this may results in frequent occurrences of the re-execution process of the face orientation angle.

Therefore, when the state in which the face orientation angle acquired from the driving state measurement unit 70 is outside the normal determination reference range continues for a predetermined time, and when it is determined that the driving states other than the face orientation angle are normal and that the traveling state is also normal, the alarm determination unit 72 causes the driving state measurement unit 70 to re-execute the face orientation angle detection process.

As used herein, the "predetermined time" is a "threshold time for re-execution of face orientation angle measurement process" that is referenced by the alarm determination unit 72 in order to determine whether or not to cause the driving state measurement unit 70 to re-execute the face orientation angle detection. While a specific value of the predetermined time may be preferably determined by an experiment in consideration of the balance between the accuracy of face orientation angle detection and the notification of the alarm for ensuring safety, it is five seconds, for example. As described above, when the state in which the face orientation angle is outside the normal determination reference range continues for a predetermined time is applied as the condition for re-executing the face orientation angle detection process, the vehicle monitoring device 1 can suppress the re-execution of unnecessary face orientation angle detection.

Figure 4:
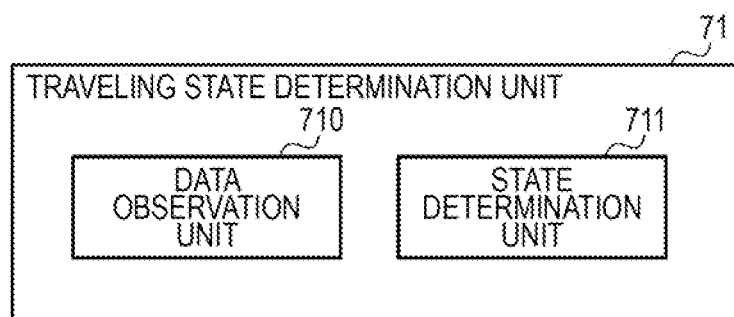
FIG. 4 is a diagram schematically showing a functional configuration of a traveling state determination unit according to an embodiment.

FIG. 4 is a diagram schematically showing a functional configuration of the traveling state determination unit 71 according to the embodiment. As shown in FIG. 4, the traveling state determination unit 71 according to the embodiment includes at least a data observation unit 710 and a state determination unit 711.

The data observation unit 710 observes type 1 observation data, which is a plurality of pieces of observation data constantly observed based on the in-vehicle sensor 3 mounted on the vehicle V. The data observation unit 710 also observes type 2 observation data, which is a plurality of pieces of observation data observed at a time of operating an operation unit mounted on the vehicle V by the driver D.

For example, type 1 observation data observed by the data observation unit 710 is an amount of change in a position in a road lane while the vehicle V is traveling in the road lane, an amount of change in a vehicle speed of the vehicle V, an amount of change in a steering angle, an amount of change in a yaw rate, an amount of change in an inter-vehicle distance, and the like. It can also be said that type 1 observation data is data that is constantly observed.

In general, when the driver D is driving the vehicle V normally, it is considered that all of type 1 observation data described above have smaller values than the case where the driver D is driving abnormally, such as dozing driving, inattentive driving, and the like. Therefore, the state determination unit 711 uses whether or not each type 1 observation data is included within the normal determination reference range determined for each type 1 observation data, as one determination reference for determining whether or not the traveling state is normal.

As used herein, the "normal determination reference range" is the range in which each type 1 observation data by the data observation unit 710 is included when the traveling state of the vehicle V is normal. The normal determination reference range of each type 1 observation data may be preferably determined by an experiment in consideration of the size of the vehicle V, the engine performance, the vehicle type, and the like.

Examples of type 2 observation data observed by the data observation unit 710 include presence and absence of pedal operation such as an accelerator pedal, a brake pedal, a clutch pedal, and the like, presence and absence of an operation of a direction indicator, presence and absence of a shift operation, and the like. It can also be said that type 2 observation data is data that is observed intermittently.

In general, when the driver D is driving the vehicle V normally, it is considered that there is a higher probability that type 2 observation data is observed than when the driver D is driving abnormally such as dozing driving or inattentive driving. This is because the pedal operation, the operation of the direction indicator, and the like are unlikely to occur unless the driver D intentionally performs the operation. When type 2 observation data is observed, it is considered that the driver D is normal and the vehicle V is traveling normally at least until the predetermined period elapses.

Therefore, the state determination unit 711 also uses whether or not type 2 observation data is observed, as another determination reference for determining whether or not the traveling state is normal. More specifically, the state determination unit 711 determines that the traveling state of the vehicle V is normal until the predetermined period elapses after the time when type 2 observation data is observed.

In this example, the "predetermined period" is a period used by the data observation unit 710 to determine the traveling state when type 2 observation data is observed. When the predetermined period elapses after certain type 2 observation data is observed, the data observation unit 710 stops determining the traveling state based on type 2 observation data. The specific value of the "predetermined period" may be preferably determined by an experiment in consideration of the driving pattern of the driver D or the like.

As described above, the traveling state determination unit 71 can accurately estimate the traveling state of the vehicle V based on the measurement data of the in-vehicle sensor 3 included in the vehicle V and the operation by the driver D.

Return to the description of FIG. 2. The driving state measurement unit 70 measures the driving state of the driver D using known image recognition technology and image process technology based on the image captured by the imaging unit 2. Therefore, when the quality of the image used by the driving state measurement unit 70 for measuring the driving state is low, the accuracy of measuring the driving state may be lower than when the quality is high.

Various factors can be considered as the ones to deteriorate the quality of the image, but in particular, when the pixel value of the image generated by the imaging unit 2 is saturated due to strong light reflected on the face of the driver D, or when a large shadow appears on the face of the driver D, the recognition accuracy of each of the units included in the driving state measurement unit 70 is likely to decrease.

As one of the typical situations where the face of driver D is exposed to strong light, there is a situation where the face of driver D is exposed to afternoon sun. This is because the afternoon sun has a shallow incident angle and is easy to reach the driver D without being blocked by the vehicle V. While it is considered that the morning sun immediately after sunrise has also the shallow angle of incidence, since the time zone when the afternoon sun appears is more likely to overlap with the time when the driver D is active than the time zone immediately after sunrise, it is considered that the afternoon sun has a great influence on the quality of the image generated by the imaging unit 2.

Therefore, the coordinate detection unit 73 detects the position information indicating the position of the vehicle V and the traveling direction based on the GPS data received by the GPS reception unit 4. The sunshine orientation acquisition unit 74 acquires a sunshine orientation by referring to a sunshine orientation database that stores dates and times, position information, and sunshine orientations in association with each other.

Figure 5:
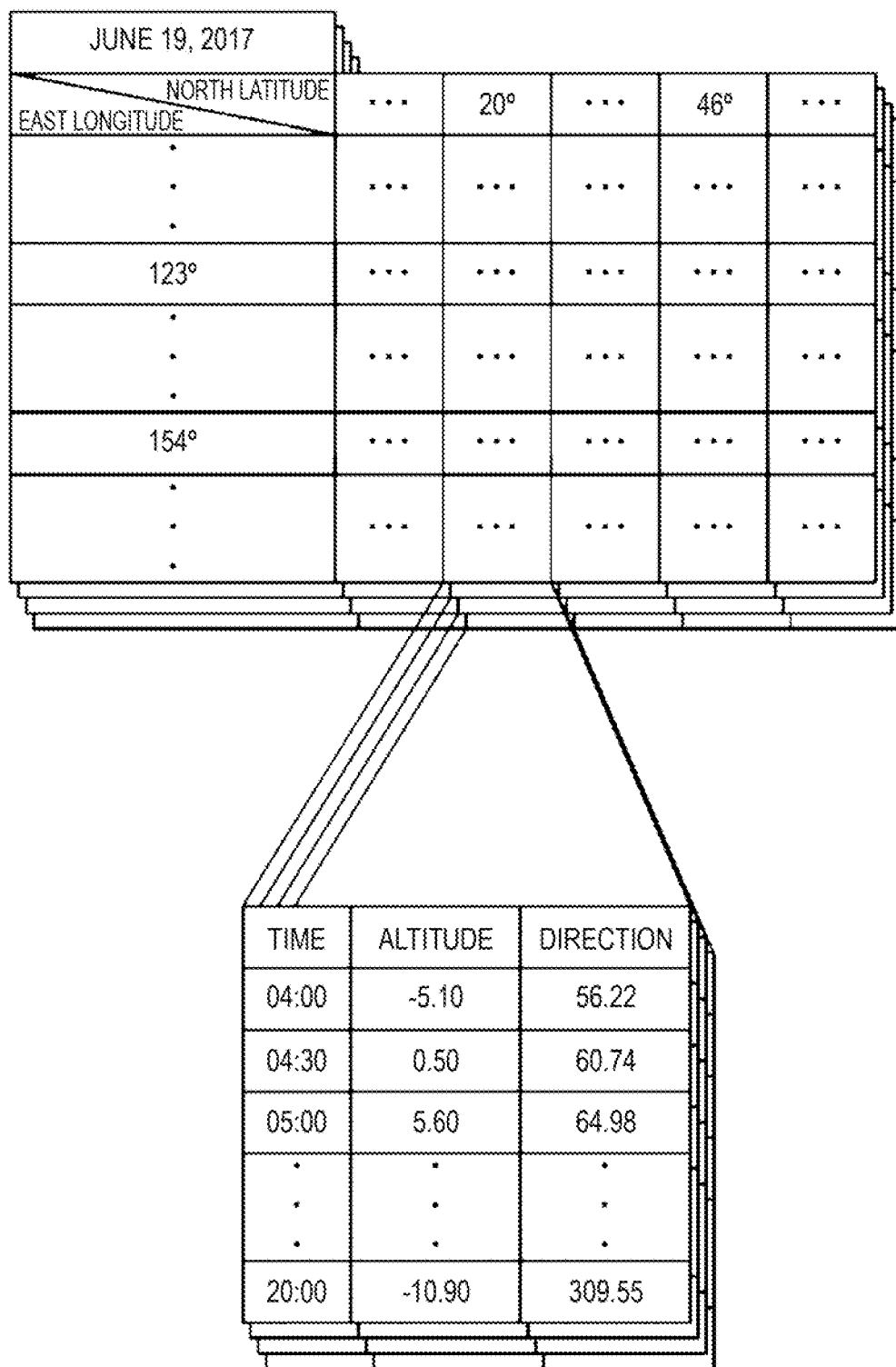
FIG. 5 is a diagram schematically showing a data structure of a sunshine orientation database according to an embodiment.

FIG. 5 is a diagram schematically showing a data structure of the sunshine orientation database according to an embodiment. The sunshine orientation database is stored in the storage unit 6 and managed by the sunshine orientation acquisition unit 74. As shown in FIG. 5, the sunshine orientation database collects the data of the sunshine orientations into units of dates. In the example shown in FIG. 5, the data of the sunshine orientation on Jun. 19, 2017 is shown.

More specifically, the sunshine orientation database collects the altitude and orientation of the sun for each combination of latitude and longitude on each date. The sunshine orientation acquisition unit 74 can designate the date, the latitude, and the longitude and acquire the altitude and orientation of the sun in every 30 minutes, for example, by referring to the sunshine orientation database.

When the face orientation angle acquired from the driving state measurement unit 70 is outside the normal determination reference range, the alarm determination unit 72 causes the driving state measurement unit 70 to re-execute the face orientation angle detection process, on condition that it is determined that the driving states other than the face orientation angle are normal and that the traveling state is also normal, and that the traveling direction of the vehicle V and the sunshine orientation at the position of the vehicle V satisfy a predetermined relationship.

As an example of a predetermined condition, the alarm determination unit 72 may use a condition that the traveling direction of the vehicle V is a direction facing the sunshine orientation. This is because when the traveling direction of the vehicle V is a direction facing the sunshine orientation, there is a high possibility that the face of the driver D is exposed to direct sunlight, which may affect the determination of the driving state of the driver D by the driving state measurement unit 70. As a result, the vehicle monitoring device 1 according to the embodiment can suppress erroneous determination regarding the driving state, and as a result, the vehicle monitoring device 1 can also suppress notification of an alarm based on the erroneous determination.

<Process Flow of Driver D Monitoring Process Executed by Vehicle Monitoring Device 1>

Figure 6:
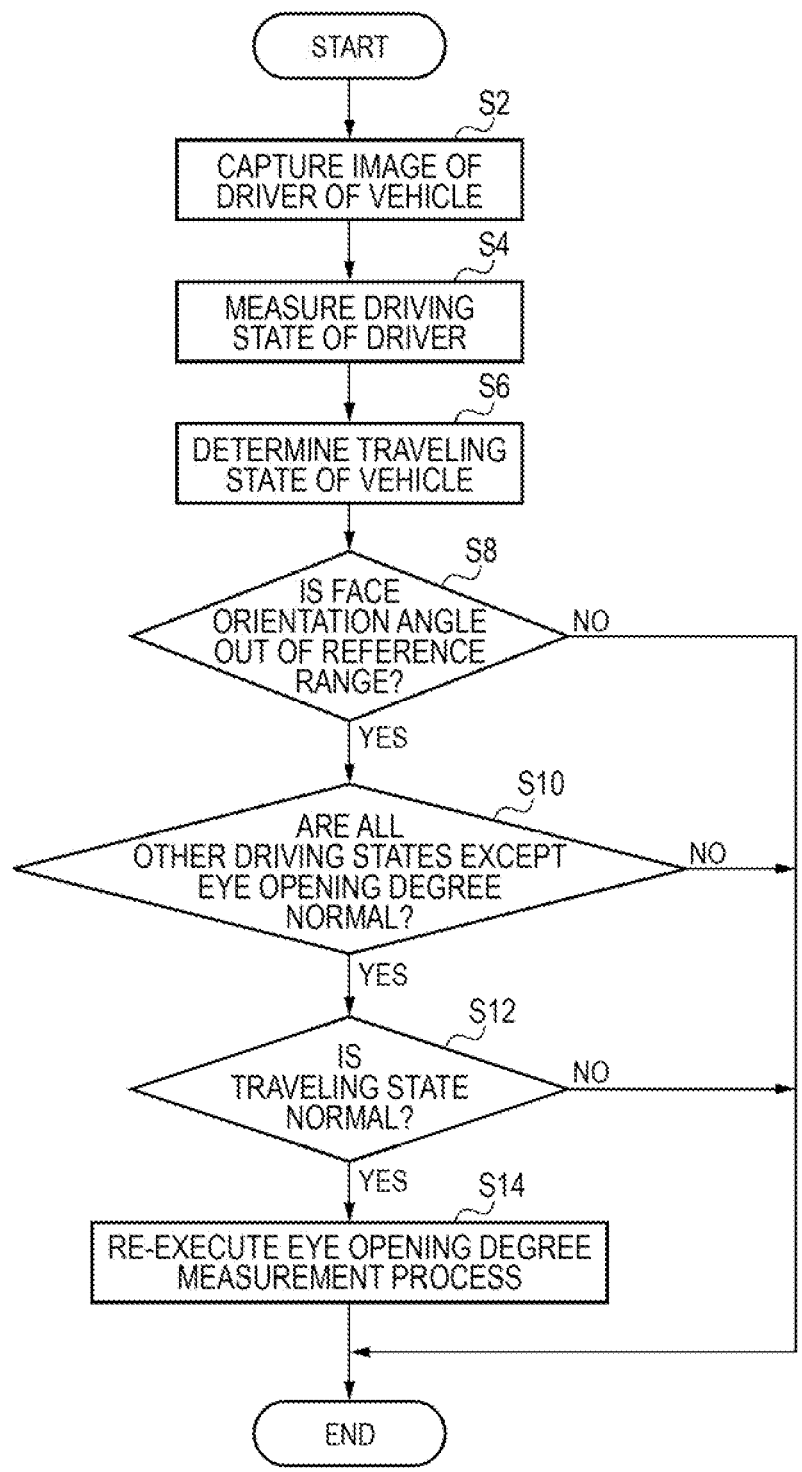
FIG. 6 is a flowchart for explaining a flow of a driver monitoring process executed by a vehicle monitoring device according to an embodiment.

FIG. 6 is a flowchart for explaining a flow of a driver D monitoring process executed by the vehicle monitoring device 1 according to an embodiment. The process in this flowchart starts when the vehicle monitoring device 1 is activated, for example.

The imaging unit 2 captures an image of the driver D of the vehicle V (S2). The driving state measurement unit 70 analyzes the image captured by the imaging unit 2 and measures a plurality of driving states including the face orientation angle of the driver D (S4). The traveling state determination unit 71 determines the traveling state of the vehicle V based on various measurement data of the in-vehicle sensor 3 (S6).

When the face orientation angle acquired by the driving state measurement unit 70 is outside the normal determination reference range (Yes in S8), and when all other driving states except the face orientation angle are normal (Yes in S10), and that the traveling state is also normal (Yes in S12), the alarm determination unit 72 causes the driving state measurement unit 70 to re-execute the face orientation angle detection process (S14).

When the driving state measurement unit 70 is caused to re-executes the measurement of the face orientation angle, when the face orientation angle acquired by the driving state measurement unit 70 is within the normal determination reference range (No in S8), and when at least one of the driving states other than the face orientation angle is abnormal (No in S10), or when the traveling state is abnormal (No in S12), the process in this flowchart ends.

<Effects of Vehicle Monitoring Device 1 According to Embodiment>

As described above, with the vehicle monitoring device 1 according to the embodiment, it is possible to suppress erroneous determination regarding the driving state.

Although the present invention has been described above using the embodiments, the technical scope of the present invention is not limited to the scope described in the above embodiments, and various modifications and changes can be made within the scope of the gist thereof. For example, the specific embodiment of the distribution or integration of the devices is not limited to the embodiments described above, and all or a part thereof can be functionally or physically distributed or integrated in any unit. Further, new embodiments resulting from any combination of the plurality of embodiments are also included in the embodiments of the present invention. The effect of the new embodiments produced by the combination has the effect of the original embodiment together.

Modification Example

In the above, as an example of type 1 observation data that can be constantly observed, the amount of change in a position in the road lane while the vehicle V is traveling in the road lane, the amount of change in the vehicle speed of the vehicle V, the amount of change in the steering angle, the amount of change in the yaw rate, the amount of change in the inter-vehicle distance, and the like have been described. More specifically, the example has been described, in which whether or not each type 1 observation data is included within the normal determination reference range determined for each type 1 observation data, is used as one determination reference for determining whether or not the traveling state is normal.

Here, the amount of change of the vehicle speed of the vehicle V, the amount of change of the steering angle, the amount of change of the yaw rate, the amount of change of the inter-vehicle distance, and the like can be adopted as type 2 observation data to be observed intermittently. In addition to the normal determination reference ranges defined for each type 1 observation data, an intermittent event observation reference range for detecting a change greater than the normal determination reference range is provided. For example, when the driver D of the vehicle V changes road lanes or increases the vehicle speed for overtaking, large changes are observed in the vehicle speed, the steering angle, the yaw rate, and the inter-vehicle distance of the vehicle V. In such a case, since it is considered that the driver D is driving the vehicle V normally, it can be adopted as a determination material for determining whether or not the traveling state is normal.

This application is based on Japanese Patent Application filed on Sep. 20, 2018 (Japanese Patent Application No. 2018-176322), the contents of which are incorporated herein by reference.

INDUSTRIAL APPLICABILITY

The vehicle monitoring device 1 according to the present disclosure can suppress erroneous determination regarding the driving state, and as a result, can also suppress notification of an alarm based on the erroneous determination. Then, it is possible to prevent the driver D from feeling unpleasant or being distrustful due to the notification of alarm based on erroneous determination.

REFERENCE SIGNS LIST

1: vehicle monitoring device
2: imaging unit
3: in-vehicle sensor
4: GPS reception unit
5: alarm device
6: storage unit
7: control unit
70: driving state measurement unit
700: face detection unit
701: eye detection unit
702: face orientation angle detection unit 703: face position detection unit
704: eye opening degree measurement unit
705: gaze detection unit
71: traveling state determination unit
710: data observation unit
711: state determination unit
72: alarm determination unit
73: coordinate detection unit
74: sunshine orientation acquisition unit
V: vehicle

The invention claimed is:

1. A vehicle monitoring device comprising:
an imaging unit which captures an image of a driver of a vehicle;
a driving state measurement unit which analyzes the image captured by the imaging unit and measures a plurality of driving states including a face orientation angle of the driver;
a traveling state determination unit which determines a traveling state of the vehicle; and
an alarm determination unit which determines whether or not to activate an alarm device based on the driving states and the traveling state, wherein,
when the face orientation angle acquired from the driving state measurement unit is outside a normal determination reference range, and when it is determined that the driving states other than the face orientation angle are normal and that the traveling state is also normal, the alarm determination unit causes the driving state measurement unit to re-execute the face orientation angle detection process.

2. The vehicle monitoring device according to claim 1, wherein,
when the state in which the face orientation angle acquired from the driving state measurement unit is outside the normal determination reference range continues for a predetermined time, and when it is determined that the driving states other than the face orientation angle are normal and that the traveling state is also normal, the alarm determination unit causes the driving state measurement unit to re-execute the face orientation angle detection process.

3. The vehicle monitoring device according to claim 1, wherein the traveling state determination unit includes:
a data observation unit which observes type 1 observation data, which is a plurality of pieces of observation data constantly observed based on an in-vehicle sensor mounted on the vehicle, and type 2 observation data, which is a plurality of pieces of observation data observed at a time of operating an operation unit mounted on the vehicle by the driver; and
a state determination unit which determines whether or not the traveling state is normal based on whether or not each piece of type 1 observation data is included within a normal determination reference range determined for each piece of type 1 observation data and whether or not type 2 observation data is observed.

4. The vehicle monitoring device according to claim 1, wherein, even when the face orientation angle acquired from the driving state measurement unit is outside the normal determination reference range, when it is determined that the driving states other than the face orientation angle are normal and that the traveling state is also normal, the alarm determination unit prohibits the activation of the alarm device.

5. The vehicle monitoring device according to claim 1, further comprising:
a coordinate detection unit which detects position information indicating a position of the vehicle and a traveling direction; and
a sunshine orientation acquisition unit which acquires a sunshine orientation by referring to a sunshine orientation database that stores dates and times, the position information, and the sunshine orientations in association with each other, wherein,
when the face orientation angle acquired from the driving state measurement unit is outside the normal determination reference range, the alarm determination unit causes the driving state measurement unit to re-execute the face orientation angle detection process, on condition that it is determined that the driving states other than the face orientation angle are normal and that the traveling state is also normal, and that the traveling direction of the vehicle and the sunshine orientation at the position of the vehicle satisfy a predetermined relationship.

* * * * *